US011097702B2

(12) United States Patent
Wulf

(10) Patent No.: US 11,097,702 B2
(45) Date of Patent: Aug. 24, 2021

(54) METHOD FOR ELECTRONICALLY CONTROLLING A BRAKE UNIT IN AN AUTOMATICALLY CONTROLLABLE UTILITY VEHICLE COMBINATION, AND ELECTRONICALLY CONTROLLABLE BRAKE UNIT IN AN AUTOMATICALLY CONTROLLABLE UTILITY VEHICLE COMBINATION

(71) Applicant: WABCO Europe BVBA, Brussels (BE)

(72) Inventor: Oliver Wulf, Neustadt (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 302 days.

(21) Appl. No.: 16/329,228

(22) PCT Filed: Jul. 17, 2017

(86) PCT No.: PCT/EP2017/000862
§ 371 (c)(1),
(2) Date: Feb. 28, 2019

(87) PCT Pub. No.: WO2018/041387
PCT Pub. Date: Mar. 8, 2018

(65) Prior Publication Data
US 2019/0248346 A1    Aug. 15, 2019

(30) Foreign Application Priority Data

Aug. 31, 2016    (DE) .................... 10 2016 010 461.9

(51) Int. Cl.
*B60T 8/17*    (2006.01)
*B60T 8/32*    (2006.01)
(Continued)

(52) U.S. Cl.
CPC .............. *B60T 8/1708* (2013.01); *B60Q 1/44* (2013.01); *B60T 7/042* (2013.01); *B60T 7/20* (2013.01);
(Continued)

(58) Field of Classification Search
CPC .... B60T 8/1708; B60T 7/042; B60T 8/17616; B60T 13/62; B60T 17/221; B60T 7/20;
(Continued)

(56) References Cited

U.S. PATENT DOCUMENTS 520,572 A    5/1894 Phillips
6,512,452 B1    1/2003 Brannan et al.
(Continued)

FOREIGN PATENT DOCUMENTS

DE    19810642 A1    9/1999
DE    10357373 B4    7/2005
(Continued)

*Primary Examiner* — Richard M Camby
(74) *Attorney, Agent, or Firm* — Leydig, Voit & Mayer, Ltd.

(57) ABSTRACT

A method for electronically controlling a brake unit having two brake systems in an automatically controllable vehicle combination includes inputting a request signal for automatic electronic activation of service brakes in a tractor vehicle brake system of a tractor vehicle and/or a trailer brake system of a trailer of the vehicle combination, wherein an automatically requested vehicle setpoint acceleration and/or an automatically requested vehicle setpoint velocity to be implemented by the respective service brakes are transmitted via the request signal. The method further includes monitoring and checking plausibility of the request signal to establish whether the automatically requested vehicle setpoint acceleration and/or the automatically requested vehicle setpoint velocity are or can be implemented completely or faultlessly by the respective service brakes. The method additionally includes outputting a trailer (Continued)

redundancy control signal at the trailer brake system under certain conditions.

25 Claims, 4 Drawing Sheets

(51) Int. Cl.
    *B60T 8/88*         (2006.01)
    *B60T 13/26*       (2006.01)
    *B60T 7/20*         (2006.01)
    *B60T 13/68*       (2006.01)
    *B60Q 1/44*       (2006.01)
    *B60T 7/04*         (2006.01)
    *B60T 8/1761*     (2006.01)
    *B60T 13/62*       (2006.01)
    *B60T 17/22*       (2006.01)

(52) U.S. Cl.
    CPC .......... *B60T 8/17616* (2013.01); *B60T 8/323* (2013.01); *B60T 8/885* (2013.01); *B60T 13/263* (2013.01); *B60T 13/62* (2013.01); *B60T 13/683* (2013.01); *B60T 17/221* (2013.01); *B60T 2270/10* (2013.01); *B60T 2270/402* (2013.01); *B60T 2270/404* (2013.01); *B60T 2270/414* (2013.01); *B60T 2270/82* (2013.01)

(58) Field of Classification Search
    CPC ........ B60T 13/683; B60T 8/323; B60T 8/885; B60T 13/263; B60T 2270/10; B60T 2270/402; B60T 2270/404; B60T 2270/414; B60T 2270/82; B60Q 1/44
    See application file for complete search history.

(56) References Cited

U.S. PATENT DOCUMENTS

| | | | |
|---|---|---|---|
| 7,703,861 B2 * | 4/2010 | Christensen | B60T 17/04 303/116.1 |
| 10,029,660 B2 * | 7/2018 | Buchner | B60T 13/683 |
| 10,137,875 B2 | 11/2018 | Hecker et al. | |
| 2010/0019565 A1 | 1/2010 | Broch et al. | |
| 2010/0174451 A1 * | 7/2010 | Leinung | B60T 17/004 701/36 |
| 2011/0005874 A1 | 1/2011 | Beier et al. | |
| 2013/0158801 A1 * | 6/2013 | Tober | B60T 13/683 701/41 |
| 2014/0180555 A1 * | 6/2014 | Eckert | B60T 8/1708 701/79 |
| 2016/0332606 A1 * | 11/2016 | Buchner | B60T 13/683 |
| 2018/0072290 A1 * | 3/2018 | Boethel | B60T 8/1766 |

FOREIGN PATENT DOCUMENTS

| | | |
|---|---|---|
| DE | 102007020881 A1 | 7/2008 |
| DE | 102014100069 A1 | 7/2015 |
| DE | 102014107399 A1 | 11/2015 |
| DE | 102015011296 A1 | 3/2017 |
| DE | 102016005318 A1 | 11/2017 |
| EP | 1730006 B1 | 12/2012 |
| JP | 2006044624 A | 2/2006 |
| WO | WO 2008084092 A1 | 7/2008 |
| WO | WO 2016045652 A1 | 3/2016 |

* cited by examiner

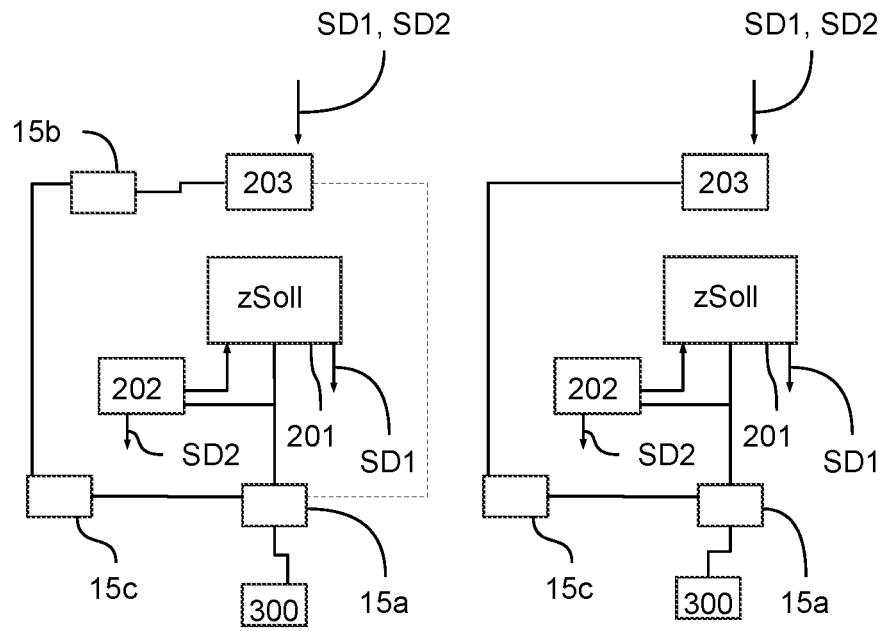
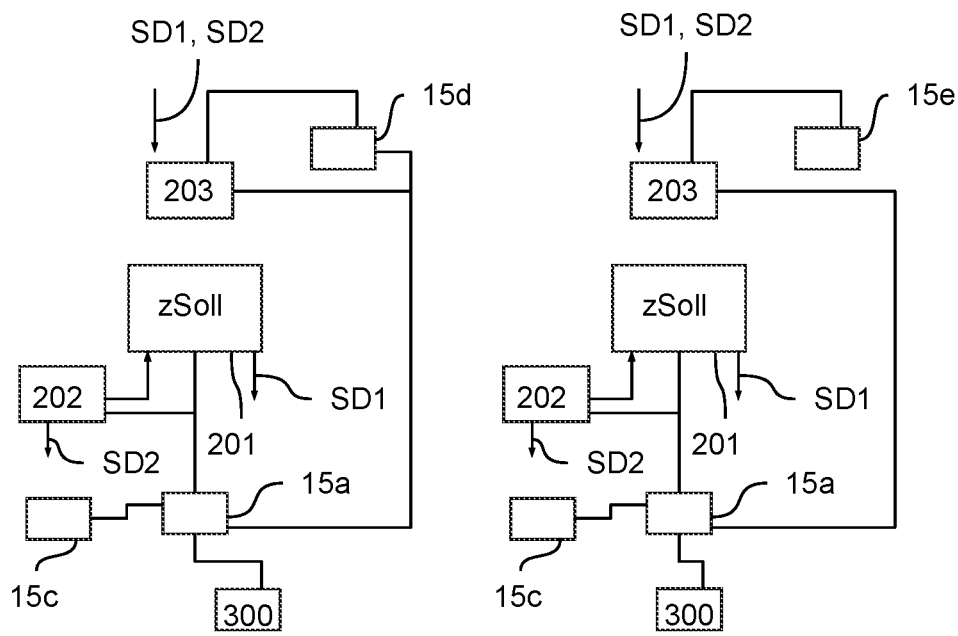

METHOD FOR ELECTRONICALLY CONTROLLING A BRAKE UNIT IN AN AUTOMATICALLY CONTROLLABLE UTILITY VEHICLE COMBINATION, AND ELECTRONICALLY CONTROLLABLE BRAKE UNIT IN AN AUTOMATICALLY CONTROLLABLE UTILITY VEHICLE COMBINATION

CROSS REFERENCE TO RELATED APPLICATIONS

This application is a U.S. National Stage Application under 35 U.S.C. § 371 of International Application No. PCT/EP2017/000862 filed on Jul. 17, 2017, and claims benefit to German Patent Application No. DE 10 2016 010 461.9 filed on Aug. 31, 2016. The International Application was published in German on Mar. 8, 2018 as WO 2018/041387 A1 under PCT Article 21(2).

FIELD

The invention relates to a method for electronically controlling a brake unit, in particular a pneumatic brake unit, in an automatically controllable utility vehicle combination, and an electronically controllable brake unit, in particular a pneumatic brake unit, in an automatically controllable utility vehicle combination.

BACKGROUND

In vehicle combinations, in particular utility vehicle combinations, consisting of a tractor vehicle and a trailer, in which an electronically controllable pneumatic tractor vehicle brake system is used in the tractor vehicle and an electronically controllable trailer brake system (TEBS) is used in the trailer, braking requests can be implemented both in the tractor vehicle and also in the trailer in dependence on a driver command predefined by a foot brake valve or in dependence on an automatically predefined vehicle setpoint acceleration or vehicle setpoint velocity.

For this purpose, electronic axle modulators of the tractor vehicle are activated in dependence on the driver command or the automatic specification by a central control unit (ECU), which then pneumatically impose a tractor vehicle brake pressure at the tractor vehicle service brakes in the tractor vehicle brake system. At the same time, an electrical activation of the trailer brake system also takes place via the central control unit via a trailer plug connection, so that the trailer is decelerated simultaneously with the tractor vehicle in dependence on the driver specification and/or the automated specification.

To form an automatically activatable redundancy in such brake units, in particular in automatically controlled utility vehicles and utility vehicle combinations, which can intervene automatically in the event of a defect in the electronic activation of the axle modulators and if no driver is in the vehicle or at the driving position or the driver is inattentive or involved with other things, solutions are known, which however require a plurality of additional electrically activatable pneumatic components, so that the assembly and cost expenditure is increased. Retrofitting capability is therefore only possible with increased expenditure.

WO 2016/045652 A1 discloses for this purpose, for example, an electropneumatic brake unit having a foot brake valve, the brake pedal position of which can be sensed, and the output foot brake valve control pressure of which can be modified to activate the axle modulators independently of a brake pedal position. For this purpose, a solenoid valve device having, for example, two 3/2-way valves is provided, which introduces a foot brake input pressure into the foot brake valve depending on the electronic request. The acting foot brake input pressure is retained via an additional retention valve. A control piston is mechanically moved pneumatically in the foot brake valve by the acting foot brake input pressure, so that a foot brake valve control pressure corresponding to the pneumatic actuation is output by the foot brake valve, which pressure is relayed as the control pressure to the axle modulators. In case of fault, i.e., if the electrical activation of the service brakes via an electrical activation of the axle modulators fails, and if manual actuation by the driver is not provided, braking can be effectuated via the foot brake valve and its pneumatic channel. An electronically controlled, mechano-pneumatic actuation of the foot brake valve is thus provided.

A further mechanical actuation of the foot brake valve is disclosed, for example, in U.S. Pat. No. 7,520,572 B2 and EP 1 730 006 B1. A method is shown in each case here in which the foot brake valve can be actuated by an electronic control unit in addition to the brake pedal. The brake request can be predefined via the brake pedal at the foot brake valve, on the one hand, or independently thereof via a brake valve actuator, which is arranged between the brake pedal and the foot brake valve. The brake valve actuator is controlled by the electronic control unit, by implementing a regulating pressure at the brake valve actuator if a control signal for decelerating the vehicle is present, which actuator is embodied, for example, as a pneumatic valve, so that the foot brake valve is actuated.

An electronic brake system having at least two brake circuits is disclosed in DE 103 57 373 B4. The electronic brake system has a central control unit, which specifies the overall braking action of the service brakes in the at least two brake circuits in dependence on a specification of a brake request pickup means, for example, a brake pedal and/or foot brake valve. A further autonomous brake circuit controller, which is also connected to the brake request pickup means, intervenes if the central control unit has failed, if it reports a fault, or the autonomous brake circuit controller recognizes a fault in the signals from the central control unit. In this case, the autonomous brake circuit controller controls the brake circuit assigned thereto itself, by outputting control signals which result in a corresponding activation of the service brakes of this brake circuit in dependence on the specification of the brake request pickup means.

For the deceleration of the utility vehicle combination by the trailer, a method for stabilizing the utility vehicle combination is described in DE 198 10 642 A1, in which the trailer can be decelerated independently in stability-critical situations. As soon as a safety-critical driving state has been recognized, trailer control signals for actuating the trailer service brakes in the trailer brake circuit are output at a trailer plug connection between the tractor vehicle and the trailer. Skidding situations or a breakaway of the trailer can thus be avoided in such situations.

DE 10 2007 020 881 A1 and U.S. Pat. No. 6,512,452 B1 describe transmitting trailer control signals for activating the trailer brake circuit via a trailer plug connection, which has a CAN interface or a PLC interface (powerline communication), from the central control unit to the trailer, in order to be able to effectuate electrically controlled braking of the trailer from the tractor vehicle.

SUMMARY

In an embodiment, the present invention provides a method for electronically controlling a brake unit having two brake systems in an automatically controllable vehicle combination. The method includes inputting a request signal for automatic electronic activation of service brakes in a tractor vehicle brake system of a tractor vehicle and/or a trailer brake system of a trailer of the vehicle combination, wherein an automatically requested vehicle setpoint acceleration and/or an automatically requested vehicle setpoint velocity to be implemented by the respective service brakes are transmitted via the request signal. The method further includes monitoring and checking plausibility of the request signal to establish whether the automatically requested vehicle setpoint acceleration and/or the automatically requested vehicle setpoint velocity are or can be implemented completely or faultlessly by the respective service brakes. The method additionally includes outputting a trailer redundancy control signal at the trailer brake system if an implementation of the automatically requested vehicle setpoint acceleration and/or of the automatically requested vehicle setpoint velocity is not or cannot be performed completely or faultlessly.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1A:
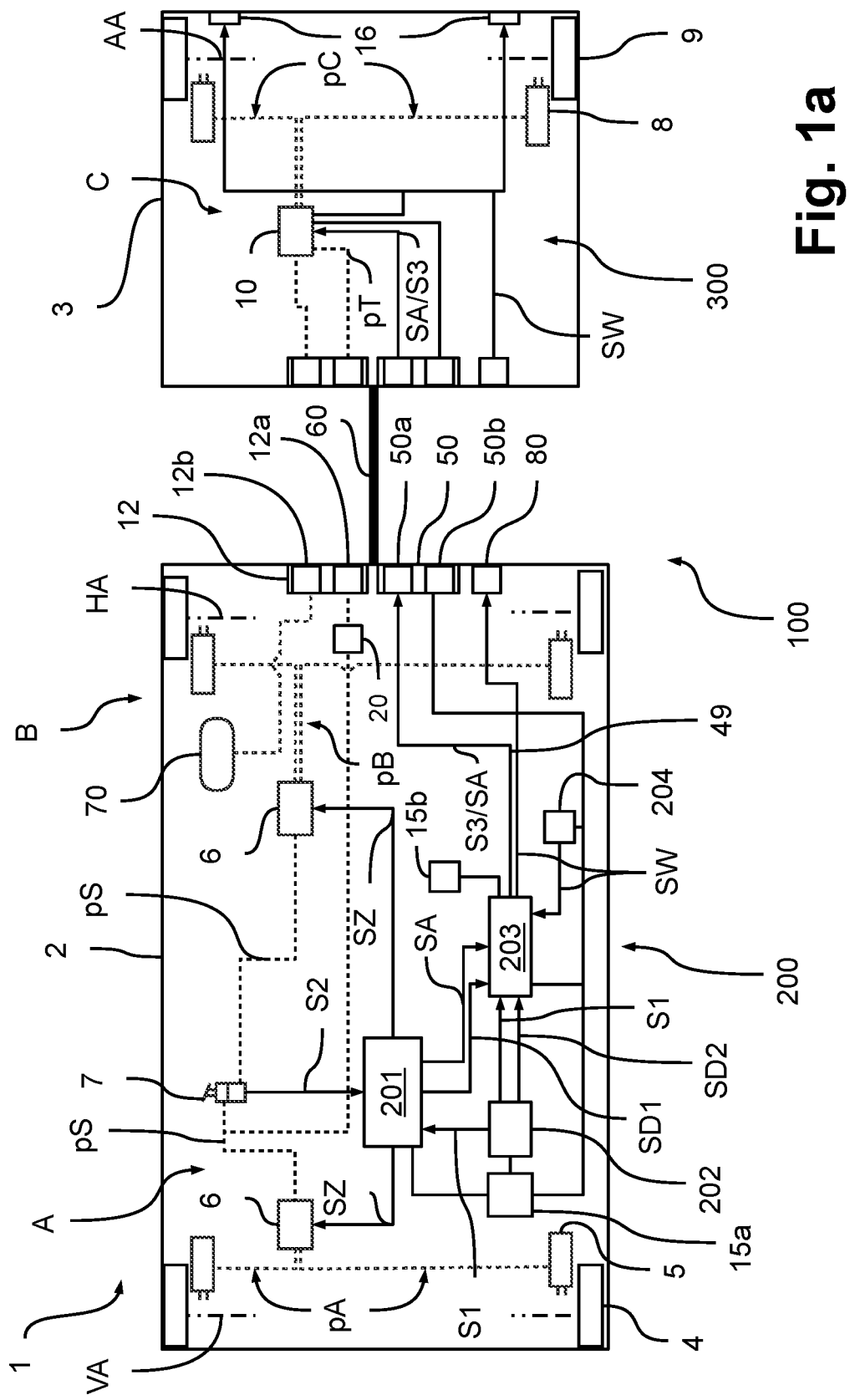
FIGS. 1a,b show brake systems according to embodiments of the invention in a utility vehicle combination as schematic block diagrams.

Embodiments of the invention provide methods for electronically controlling a brake unit in an automatically controllable utility vehicle combination, by which a secure and reliable electronically controlled braking can be ensured with little effort in case of fault. Furthermore, embodiments of the invention provide electrically controllable brake units for automatically controllable utility vehicle combinations.

It is therefore recognized according to the invention that in a vehicle combination, in particular in an automatically controllable utility vehicle combination, in the event of a failure in the electrical activation of service brakes of the vehicle combination—i.e., in case of fault—it is solely important that the vehicle can be transferred safely into a decelerated state. The safely decelerated state can mean in this case, depending on the fault and application, immediate deceleration to a standstill, stopping on the shoulder or in an emergency stop bay, or taking over the braking function until repair. Accordingly, components which are not absolutely necessary in such a case of fault in order to ensure deceleration of the vehicle combination or a low noise development and a low level of wear, can be omitted, since the components which are only active in case of fault are not to be adapted to the continuous operation of the brake unit. Rather, the case of fault is the exceptional case in operation of the brake unit.

It is provided for this purpose according to the invention, after a determination that braking of a vehicle combination, which is automatically requested via a request signal and is to be implemented by a central control unit via axle modulators, is not implemented or cannot be implemented completely or faultlessly by the service brakes of the vehicle combination, that a trailer redundancy control signal is to be output to a trailer brake system in a trailer of the vehicle combination by a monitoring unit, as a result of which trailer service brakes are actuated. In case of fault, i.e., in the event of a failure or a defect in the automated electrical activation of the service brakes via the central control unit, electronically controlled redundant braking is thus effectuated by an electrical activation of the trailer brake system via the monitoring unit.

The trailer brake system is thus used in case of fault as an electrically controlled brake actuator to transfer the entire vehicle combination into a safe state, in particular a standstill. Accordingly, the method according to the invention can only be carried out if a trailer having a corresponding functional electrically activatable trailer brake system is also present in the vehicle combination. The assistance control unit only outputs an automated request for this purpose, for example, when such a trailer has been detected.

In an automatically controllable vehicle combination having a brake unit, preferably a pneumatic brake unit, in addition to a pneumatic redundancy manually controllable by the driver via a foot brake valve, an electrically controllable redundancy can thus be formed, so that even if the driver is not at the driving position or is inattentive, secure braking can be ensured.

For this purpose, it is only necessary to retrofit or install the monitoring unit, which is arranged according to the invention in a data line before a trailer axle modulator, in order to implement the requested braking in the trailer brake system. The monitoring unit monitors and checks for plausibility in this case whether the automatically predefined request signal is or can be implemented faultlessly, wherein for this purpose the functionality of the central control unit and also of an assistance control unit outputting the automated request signal and also the defectiveness of the signals output by the central control unit and the assistance control unit, via which the pneumatic brake unit is electrically controlled in normal operation, is checked.

For this purpose, for example, it can be provided that it is checked whether the request signal which transmits a vehicle setpoint acceleration and/or a vehicle setpoint velocity, and/or tractor vehicle control signals and trailer control signals, which are output by the central control unit to control the axle modulators in the tractor vehicle and in the trailer, are transmitted completely and faultlessly or they have, for example, interruptions and unintended jumps, i.e., the signal curve is not monotonous or is outside the physically reasonable limits. Such signal faults have the result that the requests transmitted via the request signal from the pneumatic brake unit in the vehicle combination cannot be implemented completely or faultlessly or indicate an internal fault of the assistance control unit, which has output the request signal.

Alternatively or additionally, it can be provided that it is checked whether an actually present vehicle actual acceleration and/or a vehicle actual velocity corresponds within a tolerance to the automatically requested vehicle setpoint acceleration or the vehicle setpoint velocity, respectively. If this is not the case after a specific duration, for example, a fault in the electrical activation of the brake system can be concluded, which was not recognized by a self-diagnosis and as a result of which the automated requests cannot be implemented completely or faultlessly.

Moreover, a defect established in a self-diagnosis in the respective control unit or in the connected sensors and actuators can also be indicated by the central control unit or the assistance control unit via a diagnosis signal. As soon as the monitoring unit receives this information, it can conclude that an electrical activation of the respective control units is no longer safely and reliably possible, so that the automated requests can no longer be implemented completely or faultlessly. In this case, the monitoring unit can also establish whether the central control unit and/or the assistance control unit do transmit diagnosis signals at all, or whether a CAN timeout or a connection fault is present. Upon this, too, the monitoring unit can intervene by braking.

In all of these checks and plausibility checks, it can be established whether faultless operation is present or a case of fault occurs. If a case of fault is established, the monitoring unit outputs the trailer redundancy control signal to the trailer axle modulator in order to transfer the vehicle combination into a safe state. In contrast, if faultless operation is established, the faultless trailer control signal output by the central control unit is relayed unchanged by the monitoring unit to the trailer axle modulator. If it is established that, for example, only the central control unit is defective but the assistance control unit functions, it can also be provided that the trailer redundancy control signal is to be generated in dependence on an automatically predefined request signal. The monitoring unit thus advantageously takes over the braking and ensures that the automated brake request can nonetheless be implemented via the trailer, at least until the next safe stopping point or until the upcoming repair.

Since only the monitoring unit is to be retrofitted in an existing brake unit, the installation and retrofitting expenditure can be minimized, since only the electrical wiring is to be adapted and otherwise no changes are to be carried out. The monitoring unit preferably has plug-compatible and pin-compatible fittings for this purpose, so that simple retrofitting ability to the existing wiring can be ensured or the variety of variants in new vehicles with and without automatic driving functions remains small.

Therefore, in case of fault, only the trailer brake system of the vehicle combination is advantageously actively actuated and a redundant electrical activation of the tractor vehicle brake system is not necessarily required. The driving stability can thus be ensured in case of fault, since anti jackknifing braking is effectuated, which prevents jackknifing of the vehicle combination. Safe redundant braking can thus be effectuated using simple means even if the driver does not himself redundantly intervene pneumatically.

The driving stability in case of fault can additionally be increased since the monitoring unit is connected before the trailer axle modulator, so that a brake slip regulation controllable by the trailer axle modulator can advantageously also be carried out in case of fault, if this regulation is activated using the trailer redundancy control signal.

Advantageously, in the event of an activation of the trailer brake system via the trailer redundancy control signal by the monitoring unit in case of fault, an electrical activation of the trailer brake system from the central control unit, for example, is prevented, so that in case of fault, deceleration into the safe state is forced and no further systems can electronically intervene in the braking externally.

However, it is provided that the redundant braking electrically requested by the monitoring unit in case of fault can be manually overridden by the driver, for example, by the driver actuating the foot brake valve. The pneumatic redundancy thus becomes active, in which the driver can himself intervene in the event of an electrical failure or defect. For this purpose, a select-high functionality can be formed in the trailer axle modulator, which causes a selected, in particular the higher request to be imposed by the trailer axle modulator, wherein the select-high functionality is formed, for example, by software in the trailer axle modulator. I.e., the maximum of the braking manually requested by the driver and the braking electrically requested by the monitoring unit via the trailer redundancy control signal is implemented.

Furthermore, it can be provided that an activation of brake lights, in particular of the trailer, can be performed via the monitoring unit. A light system in the trailer activated for this purpose via the monitoring unit is designed for this purpose in such a way that in the event of an activation of the brake lights, the trailer brake system, in particular the trailer axle modulator, is also supplied with energy. An energy supply of the trailer brake system can thus advantageously also be ensured in case of fault and the following traffic can be warned. The safety increases.

For the transmission of the respective electrical signals from the tractor vehicle to the trailer, a trailer plug connection is provided, via which both energy and also signals can be transmitted, which enable operation of the trailer brake system. The trailer plug connection can have for this purpose, for example, a CAN interface for transmitting data and a supply interface for transmitting energy or alternatively a PLC interface (powerline communication) for combined transmission of data and energy. Such a trailer plug connection is advantageously generally already provided in the utility vehicle combination, so that no additional expenditure arises due to the connection of a further plug connection during the coupling and uncoupling of the trailer.

To enable secure electrically redundant operation, the central control unit, the monitoring unit, and the assistance control unit can be supplied by a first energy source and the monitoring unit can be supplied by an additional second energy source, which is independent of the first energy source. Even in the event of a failure of the first energy source, an electrically redundant operation can thus be ensured, wherein the first and/or the second energy source also supply the trailer brake system with energy via the supply interface or the PLC interface or the brake light interface. An energy supply in case of redundancy can also be ensured by a generator, for example, a dynamo, and/or a short-term accumulator and/or a high-voltage accumulator, which each function independently of the first energy source, instead of by the second energy source.

According to one design, it can additionally be provided that not only the brake requests but rather also requests for the control of an engine or an automatic transmission of the vehicle combination, which are transmitted via the request signal, are monitored and checked for plausibility. Therefore, even in the event of a defect in the drivetrain of the vehicle combination, it is possible to react with electrically redundant braking via the trailer to transfer the vehicle combination into a safe state.

Figure 1B:
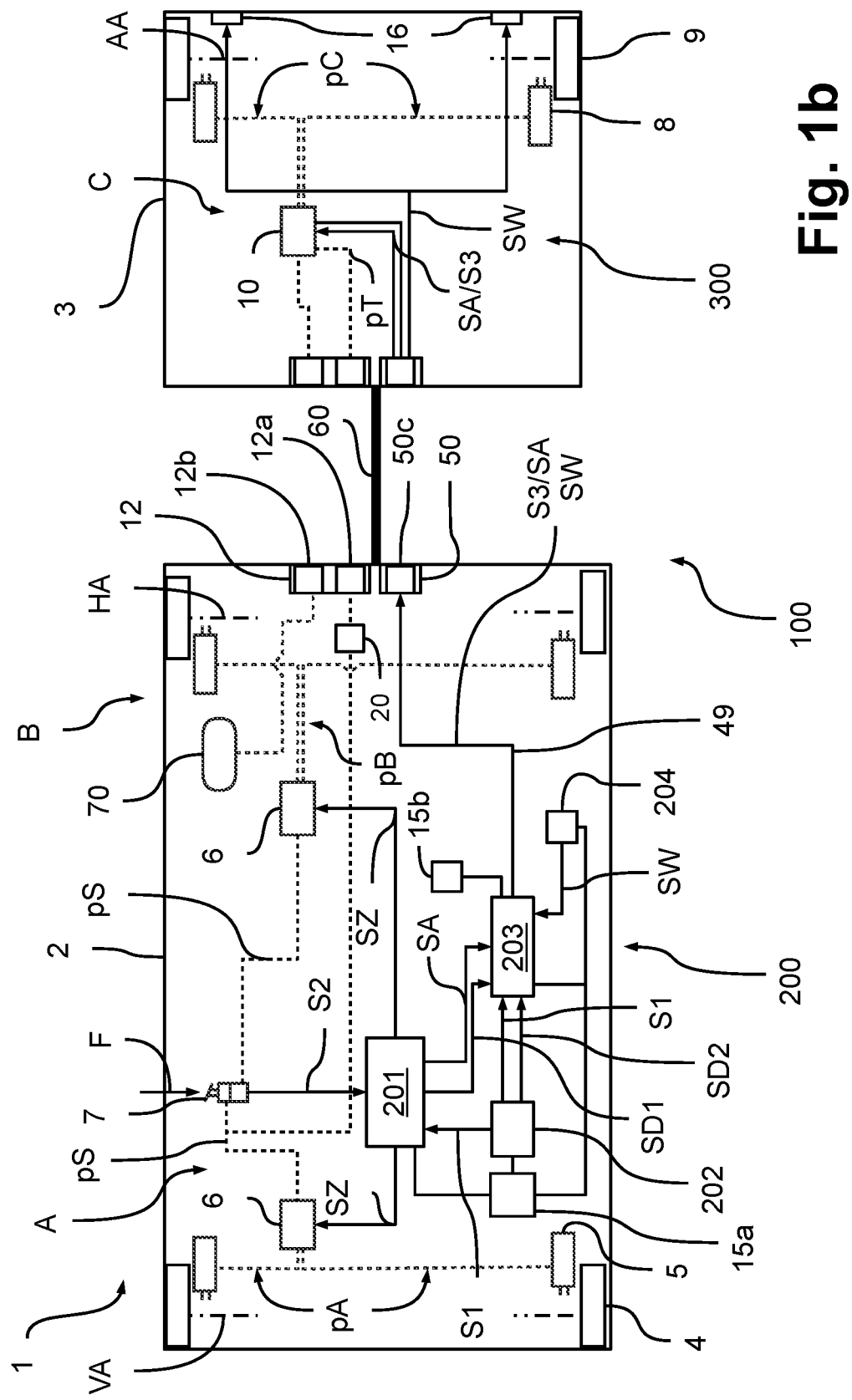
FIGS. 1c-f show variants of an energy supply of an electro-pneumatically controlled brake system.

FIG. 1a and FIG. 1b schematically show a vehicle combination, in particular a utility vehicle combination 1, made of a tractor vehicle 2 and a trailer 3 having a brake unit 100, which has two electrically controllable pneumatic brake systems 200, 300, wherein a pneumatic tractor vehicle brake system 200 is associated with the tractor vehicle 2 and a pneumatic trailer brake system 300 is associated with the trailer 3. The trailer 3 is connected via a mechanical coupling 60, for example, via a kingpin, to the tractor vehicle 2.

The tractor vehicle brake system 200 has two tractor vehicle brake circuits A, B, which are each associated with one tractor vehicle axle VA, HA and in which wheels 4 of the tractor vehicle 2 can be decelerated via tractor vehicle service brakes 5. For this purpose, a central control unit 201 is provided in the tractor vehicle 2, which electrically activates the tractor vehicle brake system 200 and the trailer brake system 300, wherein for this purpose the tractor vehicle axle modulators 6 associated with the tractor vehicle axles VA, HA are activated electronically, which impose a tractor vehicle brake pressure pA, pB corresponding to an electronic request on the tractor vehicle service brakes 5 of the respective tractor vehicle brake circuits A, B. It is also possible to react to a case of brake slipping using the tractor vehicle axle modulators 6 by way of a corresponding electronic controller.

The electronic request can be specified either by a foot brake valve 7 by manual actuation F by a driver or else by an assistance control unit 202, which is designed to automatically control, in particular decelerate, the vehicle combination 1. The assistance control unit 202 outputs for this purpose a request signal S1 at the central control unit 201 having a vehicle setpoint acceleration aSetpoint and/or a vehicle setpoint velocity vSetpoint. The central control unit 201 outputs a corresponding tractor vehicle control signal SZ in dependence on the request signal S1 to the tractor vehicle axle modulators 6 of the tractor vehicle brake system 200, in order to set or regulate the vehicle setpoint acceleration aSetpoint or the vehicle setpoint velocity vSetpoint, respectively, for the vehicle combination 1. An actuating signal S2 can correspondingly also be electronically transmitted to the central control unit 201 from the foot brake valve 7, which outputs the tractor vehicle control signal SZ as a result thereof.

To also decelerate the trailer 3 in an electronically controlled manner, furthermore a trailer control signal SA is output by the central control unit 201 in dependence on the electronic request, i.e., the request signal S1 or the actuating signal S2, and in normal operation is transmitted via a monitoring unit 203 and a data line 49 to a trailer plug connection 50, wherein the trailer plug connection 50 is embodied, for example, as an ISO-7638 plug connection, which, according to FIG. 1a, has a CAN interface 50a for data transmission and a supply interface 50b for energy transmission and, according to FIG. 1b, has a PLC interface 50c (powerline communication) for simultaneously transmitting data and energy. The trailer brake system 300 is electrically activated using the trailer control signal SA.

In the case of a PLC interface 50c (FIG. 1b), the trailer control signal SA is transmitted, appropriately modulated, on the same data line 49 as the energy supply. The supply of the trailer brake system 300 with energy is performed in this case via the monitoring unit 203. In contrast, in FIG. 1a, the trailer brake system 300 is supplied with energy via the supply interface 50b.

According to this exemplary embodiment, the trailer brake system 300 has a trailer brake circuit C, in which trailer service brakes 8 on wheels 9 of the trailer axis AA are supplied with a trailer brake pressure pC. The trailer brake pressure pC is generated for this purpose by a trailer axle modulator 10 in dependence on the trailer control signal SA or a trailer redundancy control signal S3, which is transmitted to the trailer axle modulator 10 via the CAN interface 50a or the PLC interface 50c, respectively, from the central control unit 201 via the monitoring unit 203 in the tractor vehicle 2. It is also possible to react to a case of brake slipping or other comfort functions can be formed using the trailer axle modulator 10 by way of a corresponding control.

In case of fault, i.e., in the event of a failure of the electronic activation of the tractor vehicle brake system 200 and/or the trailer brake system 300 via the tractor vehicle axle modulators 6 or the trailer axle modulator 10, respectively, by the central control unit 201, in particular a redundant pneumatic activation can be used, for example, by outputting a foot brake valve control pressure pS corresponding to the actuation F of the foot brake valve 7 from the foot brake valve 7 via a pneumatic line to the tractor vehicle axle modulators 6, wherein the foot brake valve control pressure pS can also be different in the two tractor vehicle brake circuits A, B.

The foot brake valve control pressure pS is accordingly airflow-boosted in the case of a pneumatically redundant activation of the tractor vehicle axle modulators 6 and output as the tractor vehicle brake pressure pA, pB at the tractor vehicle service brakes 5. At the same time, the foot brake valve control pressure pS is also transmitted via a trailer check valve 20 to a trailer control valve 12 and output via a pneumatic trailer control fitting 12a of the trailer control valve 12 as the trailer control pressure pT at the trailer axle modulator 10, which in case of fault also outputs this trailer control pressure pT in airflow-boosted form and as the trailer brake pressure pC at the trailer service brakes 8, to also be able to decelerate the trailer 3 during the pneumatically redundant activation. The pneumatic supply of the trailer brake circuit C is ensured via a pressure medium reserve 70 in the tractor vehicle 2, from which pressure medium is output via a pneumatic trailer supply fitting 12b of the trailer control valve 12 at the trailer axle modulator 10.

A pneumatic activation in the pneumatic redundancy is performed by a solely manual actuation F of the foot brake valve 7, as soon as the driver has recognized a failure in the electrical activation.

In order to enable an electrically controlled redundancy and thus also an electrically redundant deceleration of the vehicle combination 1 in the event of a failure of the electronic activation of the tractor vehicle brake system 200 and/or the trailer brake system 300, if the driver does not actuate the foot brake valve 7, is inattentive, or is not in the driving position, in addition the monitoring unit 203 is arranged in the data line 49 before the trailer plug connection 50. The monitoring unit 203 is used for checking and/or checking the plausibility of whether the request signal S1 output by the assistance control unit 202 for automatically decelerating the vehicle combination 1 is or can be implemented completely and faultlessly, i.e., the vehicle setpoint acceleration aSetpoint or the vehicle setpoint velocity vSetpoint, respectively, are or can be achieved. In this case, both the functionality of the assistance control unit 202 or the faultiness of the request signal S1 and also the functionality of the central control unit 201 or the faultiness of the control signals SA, SZ, respectively, are checked and/or checked for plausibility.

A failure in the central control unit 201 and/or the assistance control unit 202, which has the result that the control signals SA, SZ or the request signal S1, respectively, cannot be output faultlessly and thus faultless implementation of the braking is already not possible, or a fault has been recognized in another component of the brake unit 100, for example, a fault in one of the axle modulators 6 or the compressed air supply, is reported via a diagnosis signal SD1, SD2 by the corresponding control unit 201, 202 to the monitoring unit 203, so that it can intervene appropriately in the braking. The diagnosis signal SD1, SD2 is produced in this case in an internal diagnosis E by the corresponding control unit 201, 202 itself, wherein the diagnosis signal SD1, SD2 transmits the information as to whether the respective control unit 201, 202 has a defect D. In this case, the monitoring unit 203 can also establish whether the central control unit 201 and/or the assistance control unit 202 can transmit diagnosis signals SD1, SD2 at all or a CAN timeout V1 or a connection fault V2 is present. The monitoring unit 203 can also intervene in the braking thereupon.

An incomplete implementation and/or a faultiness of the request signal S1 can be detected, for example, by sensors on the vehicle combination 1, which measure the vehicle actual velocity vActual and/or the vehicle actual acceleration aActual. If these do not correspond to the predefined vehicle setpoint acceleration aSetpoint or the vehicle setpoint velocity vSetpoint within the tolerance T after a predefined duration dt, an incomplete implementation of the electronic request can be concluded, as a result of which the vehicle combination 1 is transferred into a safe state by deceleration of the trailer 3 controlled by the monitoring unit 203.

If furthermore interruptions or jumps have been detected in the signal curves of the signals S1, SZ, SA, i.e., the signal curve is not monotonous or the signal curve is not plausible in consideration of the physical vehicle model, i.e., is outside the physically reasonable limits, the monitoring unit 203 can conclude a defect of the respective control unit 201, 202 and prevent faulty and/or incomplete implementation of the electronic request by itself ensuring redundant braking in a safe state.

If there are no failures and faults in the implementation, the monitoring unit 203 relays the trailer control signal SA output by the central control unit 201 unchanged to the trailer plug connection 50 and does not output further signals to the trailer 3. However, if this is not the case, i.e., complete and faultless electrically controlled deceleration cannot be ensured via the tractor vehicle 200 and/or the trailer 300, instead of the trailer control signal SA, a trailer redundancy control signal S3 is output at the trailer plug connection 50 by the monitoring unit 203 in such a way that a trailer brake pressure pC is provided, electrically controlled via the trailer axle modulator 10, which decelerates the vehicle combination 1 into a safe state.

Depending on the fault and application, in this case the safe state can be immediate deceleration down to a standstill SS, stopping on the shoulder or in an emergency stop bay, or taking over the brake function until repair. In the case of a redundant takeover and for the case in which only the central control unit 201 has a defect, the monitoring unit 203 modulates a trailer redundancy control signal S3, for example, which is generated in dependence on the request signal S1 automatically requested by the assistance control unit 202. The automatic request of the assistance control unit 202 is thus not transmitted as in normal operation via the central control unit 201 and the trailer control signal SA to the monitoring unit 203 and the trailer brake system 300 but rather is used directly to generate the trailer redundancy control signal S3. The monitoring unit 203 can thus also take over the braking electrically redundantly in dependence on the automated request and take over the braking of the vehicle combination 1 until the next repair.

The vehicle combination 1 can thus be decelerated by a redundant electronic activation of the trailer brake system 300 even without a manual intervention of the driver, wherein vehicle setpoint accelerations aSetpoint of up to $-2.5$ m/s$^2$ are thus enabled depending on the load and surrounding conditions.

Due to the electrically redundant deceleration of only the trailer 3, the driving stability of the vehicle combination 1 can be maintained in case of fault, since anti-jackknifing braking is effectuated, which prevents jackknifing of the vehicle combination 1. Since moreover the redundant electronic deceleration is effectuated via the trailer axle modulator 10, it is also possible to react to an impermissible brake slip BS at the wheels 9 of the trailer axle AA in case of fault, by transmitting the brake slip regulation BSR, which is active in normal operation, to the trailer axle modulator 10 via the monitoring unit 203 even in case of fault.

In order to also enable redundant pneumatic braking by the driver in the event of a redundant electronic activation via the monitoring unit 203, for example, a select-high functionality is provided in the trailer axle modulator 10, which causes either the redundant electronic activation via the trailer redundancy control signal S3 or the redundant pneumatic activation via the tractor vehicle control pressure pS or trailer control pressure pT, respectively, predefined by the foot brake valve 7 to be implemented, depending on which of the two redundant activations requests the stronger braking or the lower vehicle setpoint acceleration aSetpoint. For this purpose, a software logic is implemented in the trailer axle modulator 10, which compares the pressure corresponding to the electronic request of the trailer redundancy control signal S3 to the tractor vehicle control pressure pS or trailer control pressure pT, respectively. The driver can thus also override the electrical activation and vice versa.

Furthermore, it is provided that as soon as a redundant electronic activation is performed by specifying a corresponding trailer redundancy control signal S3 by way of the monitoring unit 203, a relay of a trailer control signal SA predefined by the central control unit 201 is prevented. I.e., the redundant electrical specification by the monitoring unit 203 has priority, so that in case of fault, a reliable transfer into a safe state is enabled, which an intervention of the central control unit 201 does not interfere with.

In order to also ensure safe redundant operation in the event of a failure of the energy supply, the central control unit 201, the assistance control unit 202, the monitoring unit 203, and the trailer brake system 300 are supplied with energy by a first energy source 15*a* via the trailer plug connection 50—i.e., the supply interface 50*b* or the PLC interface 50*c*—and the monitoring unit 203 is additionally or exclusively supplied with energy via a second energy source 15*b* independent of the first energy source 15*a*. The first energy source 15*a* and the second energy source 15*b* are both connected to a generator 15*c*, for example, a dynamo of the utility vehicle 200 (see FIG. 1*c*). In the event of a failure of the first energy source 15*a*, the second energy source 15*b* can at least ensure redundant electrical operation of the monitoring unit 203.

Alternatively, only the first energy source 15*a* connected to the generator 15*c* can also be used, which is connected via a fuse to the central control unit 201, the assistance control unit 202, and the trailer brake system 300, and via a further fuse to the monitoring unit 203.

Alternative concepts for a redundant energy supply are illustrated according to FIGS. 1*d, e, f*. According to an alternative embodiment shown in FIG. 1*d*, it is provided that the monitoring unit 203 is connected in a corresponding manner directly to the generator 15c and an energy supply is ensured via this and the central control unit 201, the assistance control unit 202, and the trailer brake system 300 are connected to the first energy source 15a. The generator 15c and the first energy source 15a are separated from one another in this case in such a way that a short circuit in the generator 15c does not necessarily ensure a short circuit in the first energy source 15a and vice versa, so that both can supply energy independently of one another in case of redundancy.

According to an embodiment illustrated in FIG. 1e, it is provided that a short-term accumulator 15d, for example, a capacitor, in particular a power cap, is to be used as an energy source, which is charged by the first energy source 15a in normal operation. If the first energy source 15a fails, the charged short-term accumulator 15d is used as an energy source for the monitoring unit 203.

According to a further embodiment, it is provided according to Figure if that a high-voltage accumulator 15e is used as a redundant energy supply, which is used in hybrid vehicles as an energy source for a drive. It is also independent of the first energy source 15a and can thus be used as a redundant energy source for the monitoring unit 203.

Alternatively, an additional redundant vehicle electrical system can also be constructed.

In the case of a PLC interface 50c in FIG. 1b, in case of fault, the trailer brake system 300 can also be supplied with energy via the monitoring unit 203 and the data line 49, which transmits both the trailer redundancy signal S3 and also the energy. To also supply the trailer brake system 300 with energy in the event of a failure of the first energy source 15a according to FIG. 1a, in addition a corresponding electronic component can be provided, which connects the second energy source 15b to the supply interface 50b in the event of a failure of the first energy source 15a.

According to an alternative embodiment, the monitoring unit 203 is additionally electrically operationally connected to a brake light controller 204. In normal operation, the brake light controller 204 outputs a brake light signal SW in the event of an automatically requested braking, which is also transmitted via the monitoring unit 203 and via a brake light interface 80 to the trailer 3. If the brake light signal SW is present in the trailer 3, brake lights 16 of the trailer 3 are activated, wherein a voltage is transmitted from the monitoring unit 203 by the present brake light signal SW, which simultaneously ensures an energy supply of the brake lights 16. This voltage is also simultaneously transmitted to the trailer axle modulator 10, so that it is always redundantly supplied with energy as soon as the brake lights 16 are activated.

If a case of fault of the monitoring unit 203 is thus detected and if the brake light controller 204 is also no longer supplied with energy because of a failure of the first energy source 15a, the monitoring unit 203, which is then supplied via the second energy source 15b, instead modulates the brake light signal SW via the brake light interface 80 to the trailer 3, whereupon the trailer brake system 300 and/or the trailer axle modulator 10 are again supplied with energy.

In case of fault, a redundant energy supply of the trailer brake system 300 can be ensured and an activation of the brake lights 16 can also be performed by the monitoring unit 203 both via the PLC interface 50c and also via the brake light interface 80.

In the case of a PLC interface 50c according to FIG. 1b, the brake light signal SW is also transmitted via this and a supply of the brake lights 16 is thus achieved. A further redundant energy supply of the trailer brake system 300 is not necessary in this case, since this redundancy is already ensured via the PLC interface 50c itself.

Figure 2:
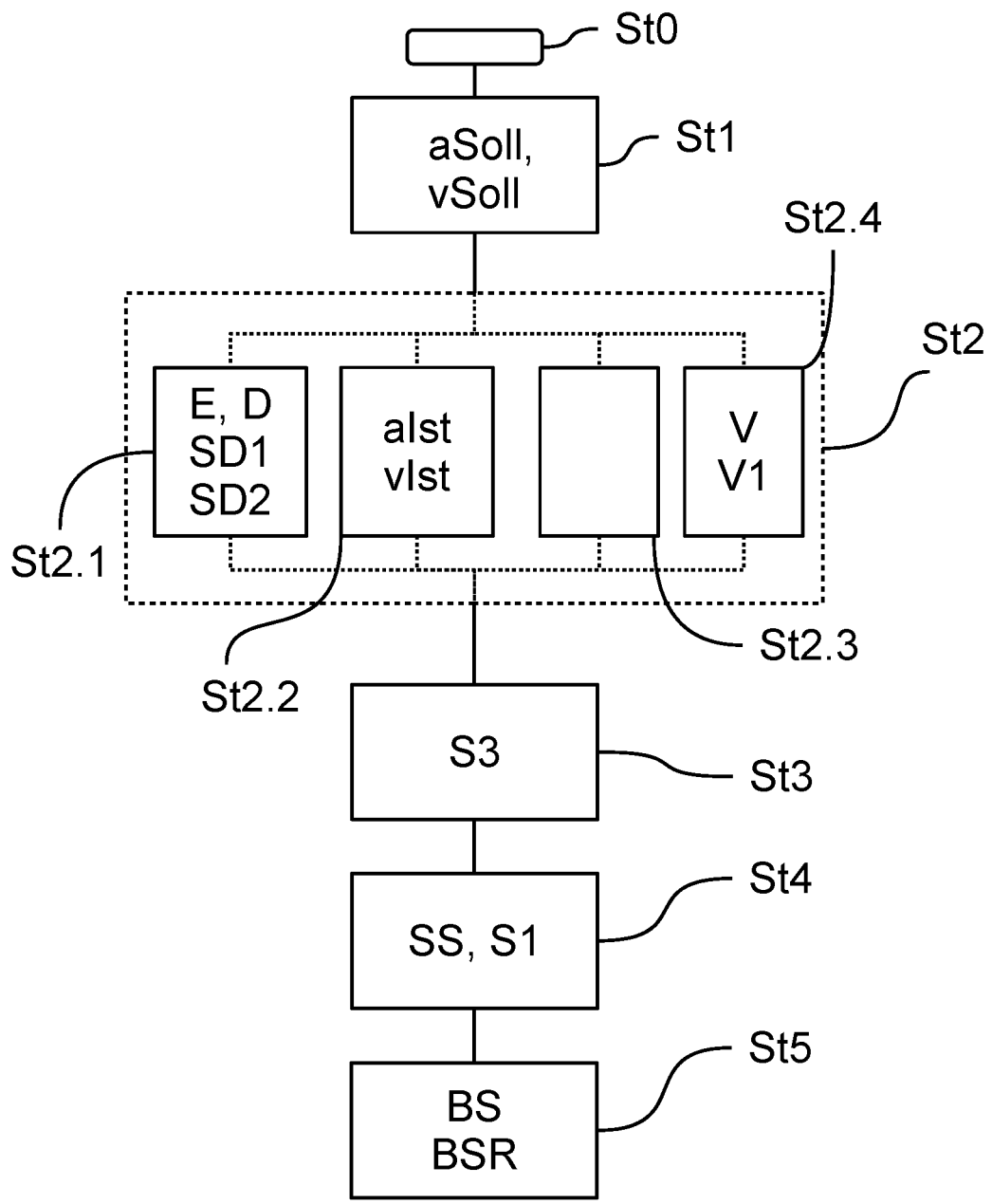
FIG. 2 shows a flow chart for carrying out a method according to an embodiment of the invention.

According to FIG. 2, the method according to the invention can be carried out as follows:

In an initial step St0, the brake unit 100 is initialized, for example, with the starting of the vehicle combination 1.

In a first step St1, the request signal S1 is input, which transmits a vehicle setpoint acceleration aSetpoint and/or a vehicle setpoint velocity vSetpoint and is used to decelerate the vehicle combination 1 in an automatically controlled manner. As a result of the request signal S1, in normal operation the tractor vehicle brake system 200 and the trailer brake system 300 are activated via the corresponding control signals SA, SZ and braking is effectuated via the respective axle modulators 6, 10.

In a second step St2, the request signal S1 is monitored and checked for plausibility by the monitoring unit 203, to establish whether the automatically requested vehicle setpoint acceleration aSetpoint and/or the automatically requested vehicle setpoint velocity vSetpoint are or can be implemented completely or faultlessly by the respective service brakes 5, 8.

For this purpose, it is checked in a partial step St2.1, for example, whether a diagnosis signal SD1, SD2 is output by the central control unit 201 and/or the assistance control unit 202, which indicate whether a malfunction or a failure of the corresponding control unit 201, 202 or the connected sensors or components is present as a result of a defect D.

In a further partial step St2.2, it can also be checked whether the automatically requested vehicle setpoint acceleration aSetpoint and/or the vehicle setpoint velocity vSetpoint correspond, in consideration of a tolerance T, to the presently existing vehicle actual acceleration aActual or the vehicle actual velocity vSetpoint, respectively.

In a partial step St2.3, it can also be determined by the monitoring unit 203 whether there are interruptions in the signal transmission and the request signal S1 or the control signals SZ, SA have jumps which indicate a defect in the respective control unit 201, 202.

In a partial step St2.4, it can be checked whether a connection fault V, for example, a CAN timeout V1, is present and therefore no signals S1, SA, SZ, SD1, SD2 can be transmitted.

If there is a disturbance, i.e., an automated request is not implemented completely or faultlessly or cannot be implemented completely or faultlessly, in a third step St3, the trailer redundancy control signal S3 is output at the trailer plug connection 50 by the monitoring unit 203, in order, in a fourth step St4, to request electrically redundant braking of the trailer 3 via the trailer axle modulator 10 and via this to decelerate the entire utility vehicle combination 1 into a safe state, for example, the standstill SS. If there is a failure only in the central control unit 201, the trailer redundancy control signal S3 can be generated, for example, in dependence on the request signal S1 by the assistance control unit 202, so that—instead of the central control unit 201—the automated braking can be taken over by the monitoring unit 203. In a fifth step St5, if impermissible brake slip BS occurs at the trailer 3 during the electrically redundant braking, a brake slip regulation BSR can be activated, which ensures a stabilization of the trailer 3.

If there is no disturbance, the trailer control signal SA output by the central control unit 201 is relayed unchanged by the monitoring unit 203 to the trailer plug connection 50. It can also be provided in this case that latent faults are detected by the trailer brake system 300 being activated occasionally by the monitoring unit 203 even if a disturbance is not detected. It is thus possible to avoid an electrically redundant activation, which only occurs in an exceptional case, from being prevented by a latent fault.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS 1 (utility) vehicle combination
2 tractor vehicle
3 trailer
4 wheels of the tractor vehicle
5 tractor vehicle service brakes
6 tractor vehicle axle modulators
7 foot brake valve
8 trailer service brakes
9 wheels of the trailer
10 trailer axle modulator
12 trailer control valve
12a pneumatic trailer control fitting
12b pneumatic trailer supply fitting
15a first energy source
15b second energy source
15c generator
15d short-term accumulator
15e high-voltage accumulator
16 brake lights
20 trailer check valve
49 data line
50 trailer plug connection
50a CAN interface
50b supply interface
50c PLC interface
60 mechanical coupling
70 pressure medium reserve
80 brake light interface
100 brake unit
200 tractor vehicle brake system
201 central control unit (ECU)
202 assistance control unit
203 monitoring unit
204 brake light controller
300 trailer brake system
A, B tractor vehicle brake system
AA trailer axle
aActual vehicle actual acceleration
aSetpoint vehicle setpoint acceleration
BS brake slip
BSR brake slip regulation
C trailer brake circuit
D defect
dt duration
E internal diagnosis
F actuation
pA, pB tractor vehicle brake pressure
pC trailer brake pressure
pS foot brake valve control pressure
pT trailer control pressure
S1 request signal
S2 actuating signal
S3 trailer redundancy control signal
SA trailer control signal
SD1, SD2 diagnosis signal
SS standstill
SW brake light signal
SZ tractor vehicle control signal
T tolerance
V connection fault
V1 CAN timeout
VA, HA tractor vehicle axles
vActual vehicle actual velocity
vSetpoint vehicle setpoint velocity
St1, St2, St2.1, St2.2, St2.3, St2.4, St3, St4, St5 steps of the method

The invention claimed is:

1. A method for electronically controlling a brake unit having two brake systems in an automatically controllable vehicle combination, the method comprising:
inputting a request signal for automatic electronic activation of service brakes in a tractor vehicle brake system of a tractor vehicle and/or a trailer brake system of a trailer of the vehicle combination, wherein an automatically requested vehicle setpoint acceleration and/or an automatically requested vehicle setpoint velocity to be implemented by the respective service brakes are transmitted via the request signal;
monitoring and checking plausibility of the request signal to establish whether the automatically requested vehicle setpoint acceleration and/or the automatically requested vehicle setpoint velocity are or can be implemented completely or faultlessly by the respective service brakes;
outputting a trailer redundancy control signal at the trailer brake system in response to an implementation of the automatically requested vehicle setpoint acceleration and/or of the automatically requested vehicle setpoint velocity not being or not being able to be performed completely or faultlessly; and
carrying out an electrically redundant activation of the trailer brake system using the trailer redundancy control signal to transfer the vehicle combination into a safe state,
wherein deceleration of the vehicle combination is performed exclusively via the trailer brake system in response to the trailer redundancy control signal.

2. The method as claimed in claim 1, wherein, for the plausibility check of the request signal, it is checked whether a defect is present in a central control unit controlling the brake systems and/or in an assistance control unit outputting the request signal, wherein a defect is reported via a diagnosis signal, wherein the diagnosis signal is produced in a self-diagnosis in the respective control unit.

3. The method as claimed in claim 1, wherein, to check the plausibility of the request signal, it is determined whether a connection fault is present.

4. The method as claimed in claim 1, wherein, to check the plausibility of the request signal, it is determined whether an actually present vehicle actual acceleration and/or a vehicle actual velocity is within a tolerance range around the vehicle setpoint acceleration or the vehicle setpoint velocity, respectively.

5. The method as claimed in claim 1, wherein, to check the plausibility of the request signal, it is determined whether the request signal and/or control signals for electrically controlling the axle modulators of the respective brake system, which are output by a central control unit, are monotonous.

6. The method as claimed in claim 1, wherein, in the event of an incomplete or faultless implementation of the automatically requested vehicle setpoint acceleration and/or the automatically requested vehicle setpoint velocity, the tractor vehicle brake system is not activated.

7. The method as claimed in claim 1, wherein, in the event of an incomplete or faultless implementation of the automatically requested vehicle setpoint acceleration and/or the automatically requested vehicle setpoint velocity and for the case in which an assistance control unit automatically controlling the vehicle combination via a request signal does not have a defect, the trailer redundancy control signal is generated in dependence on the request signal.

8. The method as claimed in claim 1, wherein, in the event of an incomplete or faultless implementation of the automatically requested vehicle setpoint acceleration and/or the automatically requested vehicle setpoint velocity, the trailer redundancy control signal is generated such that the vehicle combination is transferred into a standstill.

9. The method as claimed in claim 1, wherein, in the event of an incomplete or faultless implementation of the automatically requested vehicle setpoint acceleration and/or the automatically requested vehicle setpoint velocity, a brake slip regulation is carried out in the trailer brake system upon occurrence of a case of brake slip.

10. The method as claimed in claim 1, wherein, in the event of an incomplete or faultless implementation of the automatically requested vehicle setpoint acceleration and/or the automatically requested vehicle setpoint velocity, only an electrically redundant activation of the trailer brake system by the trailer redundancy control signal is enabled.

11. The method as claimed in claim 1, wherein, in the event of an incomplete or faultless implementation of the automatically requested vehicle setpoint acceleration and/or the automatically requested vehicle setpoint velocity, a redundant pneumatic activation of the trailer brake system via a trailer control pressure is enabled in dependence on a manual actuation, if the pneumatically redundant brake request via the trailer control pressure is greater than the electrically redundant brake request via the trailer redundancy control signal.

12. The method as claimed in claim 1, wherein, in the event of an incomplete or faultless realization of the automatically requested vehicle setpoint acceleration and/or the automatically requested vehicle setpoint velocity, and in the event of a failure of a first energy source, an energy supply of the trailer brake system is performed via a second energy source.

13. The method as claimed in claim 12, wherein in the event of an electrically redundant activation of the trailer brake system, because of which an activation of brake lights in the trailer is performed via a brake light signal, the trailer brake system is supplied with energy via the brake light signal at the same time.

14. The method as claimed in claim 1, wherein the assistance control unit only outputs a request signal when a trailer having a trailer brake system has been detected.

15. An electrically controllable brake unit in an automatically controllable vehicle combination comprising at least a tractor vehicle and a trailer, the electrically controllable brake unit comprising:
 a tractor vehicle brake system having at least one tractor vehicle brake circuit and a trailer brake system having at least one trailer brake circuit for decelerating the vehicle combination via tractor vehicle service brakes and trailer service brakes,
 a foot brake valve configured to manually specifying an electrical actuation signal in dependence on a manual actuation,
 an assistance control unit configured to automatically specifying a request signal,
 a central control unit configured to output electrical control signals at at least one tractor vehicle axle modulator in the tractor vehicle brake system and at least one trailer axle modulator in the trailer brake system in dependence on the request signal or the actuation signal,
 a trailer plug connection configured to transmit signals from the tractor vehicle to the trailer,
 wherein furthermore a monitoring unit is provided, which is arranged in a data line leading to the trailer brake system and is designed to monitor and check the plausibility of the complete or faultless implementation of the automatically requested request signal and to output a trailer redundancy signal at the trailer brake system if the implementation is not performed or cannot be performed completely or faultlessly, to decelerate the vehicle combination via the trailer and transfer the vehicle combination into a safe state, and
 wherein the monitoring unit is arranged in a data line between the central control unit and a trailer axle modulator associated with the trailer brake system.

16. The electrically controllable brake unit as claimed in claim 15, wherein the monitoring unit is arranged in the tractor vehicle and the trailer redundancy control signal is transmittable via the trailer plug connection to the trailer brake system.

17. The electrically controllable brake unit as claimed in claim 15, wherein the trailer plug connection has a CAN interface and a supply interface or a PLC interface.

18. The electrically controllable brake unit as claimed in claim 17, wherein the central control unit, the assistance control unit, and the monitoring unit are connected to a first energy source and the monitoring unit is additionally or exclusively connected to a second energy source independent of the first energy source,
 wherein the trailer brake system can be supplied with energy via the trailer plug connection from the first or second energy source, wherein for this purpose the first energy source and/or the second energy source are connectable to the supply interface or the PLC interface.

19. The electrically controllable brake unit as claimed in claim 15, wherein the brake unit is a pneumatic brake unit.

20. A vehicle combination having an electronically controllable pneumatic brake unit as claimed in claim 15.

21. A method for electronically controlling a brake unit having two brake systems in an automatically controllable vehicle combination, the method comprising:
inputting a request signal for automatic electronic activation of service brakes in a tractor vehicle brake system of a tractor vehicle and/or a trailer brake system of a trailer of the vehicle combination, wherein an automatically requested vehicle setpoint acceleration and/or an automatically requested vehicle setpoint velocity to be implemented by the respective service brakes are transmitted via the request signal;
monitoring and checking plausibility of the request signal to establish whether the automatically requested vehicle setpoint acceleration and/or the automatically requested vehicle setpoint velocity are or can be implemented completely or faultlessly by the respective service brakes;
outputting a trailer redundancy control signal at the trailer brake system if an implementation of the automatically requested vehicle setpoint acceleration and/or of the automatically requested vehicle setpoint velocity is not or cannot be performed completely or faultlessly,
wherein, for the plausibility check of the request signal, it is checked whether a defect is present in a central control unit controlling the brake systems and/or in an assistance control unit outputting the request signal,
wherein a defect is reported via a diagnosis signal, and
wherein the diagnosis signal is produced in a self-diagnosis in the respective control unit.

22. The method as claimed in claim 21, wherein, in the event of an incomplete or faultless realization of the automatically requested vehicle setpoint acceleration and/or the automatically requested vehicle setpoint velocity, and in the event of a failure of a first energy source, an energy supply of the trailer brake system is performed via a second energy source.

23. A method for electronically controlling a brake unit having two brake systems in an automatically controllable vehicle combination, the method comprising:
inputting a request signal for automatic electronic activation of service brakes in a tractor vehicle brake system of a tractor vehicle and/or a trailer brake system of a trailer of the vehicle combination, wherein an automatically requested vehicle setpoint acceleration and/or an automatically requested vehicle setpoint velocity to be implemented by the respective service brakes are transmitted via the request signal;
monitoring and checking plausibility of the request signal to establish whether the automatically requested vehicle setpoint acceleration and/or the automatically requested vehicle setpoint velocity are or can be implemented completely or faultlessly by the respective service brakes; and
outputting a trailer redundancy control signal at the trailer brake system if an implementation of the automatically requested vehicle setpoint acceleration and/or of the automatically requested vehicle setpoint velocity is not or cannot be performed completely or faultlessly,
wherein, to check the plausibility of the request signal, it is determined whether a connection fault is present.

24. A method for electronically controlling a brake unit having two brake systems in an automatically controllable vehicle combination, the method comprising:
inputting a request signal for automatic electronic activation of service brakes in a tractor vehicle brake system of a tractor vehicle and/or a trailer brake system of a trailer of the vehicle combination, wherein an automatically requested vehicle setpoint acceleration and/or an automatically requested vehicle setpoint velocity to be implemented by the respective service brakes are transmitted via the request signal;
monitoring and checking plausibility of the request signal to establish whether the automatically requested vehicle setpoint acceleration and/or the automatically requested vehicle setpoint velocity are or can be implemented completely or faultlessly by the respective service brakes; and
outputting a trailer redundancy control signal at the trailer brake system if an implementation of the automatically requested vehicle setpoint acceleration and/or of the automatically requested vehicle setpoint velocity is not or cannot be performed completely or faultlessly,
wherein, to check the plausibility of the request signal, it is determined whether an actually present vehicle actual acceleration and/or a vehicle actual velocity is within a tolerance range around the vehicle setpoint acceleration or the vehicle setpoint velocity, respectively.

25. An electrically controllable brake unit in an automatically controllable vehicle combination comprising at least a tractor vehicle and a trailer, the electrically controllable brake unit comprising:
a tractor vehicle brake system having at least one tractor vehicle brake circuit and a trailer brake system having at least one trailer brake circuit for decelerating the vehicle combination via tractor vehicle service brakes and trailer service brakes,
a foot brake valve configured to manually specifying an electrical actuation signal in dependence on a manual actuation,
an assistance control unit configured to automatically specifying a request signal,
a central control unit configured to output electrical control signals at at least one tractor vehicle axle modulator in the tractor vehicle brake system and at least one trailer axle modulator in the trailer brake system in dependence on the request signal or the actuation signal,
a trailer plug connection configured to transmit signals from the tractor vehicle to the trailer,
wherein furthermore a monitoring unit is provided, which is arranged in a data line leading to the trailer brake system and is designed to monitor and check the plausibility of the complete or faultless implementation of the automatically requested request signal and to output a trailer redundancy signal at the trailer brake system if the implementation is not performed or cannot be performed completely or faultlessly, to decelerate the vehicle combination via the trailer and transfer the vehicle combination into a safe state, and
wherein the trailer plug connection has a CAN interface and a supply interface or a PLC interface.

* * * * *